United States Statutory Invention Registration [19]

[11] Reg. Number: H722

Sofer et al. [43] Published: Jan. 2, 1990

[54] NUCLEAR REACTOR FUEL WITH RADIALLY VARYING ENRICHMENT

[75] Inventors: George A. Sofer, Bellevue; James L. Maryott, Richland, both of

[73] Assignee: Advanced Nuclear Fuels Corporation, Bellevue, Wash.

[21] Appl. No.: 252,292

[22] Filed: Sep. 30, 1988

[51] Int. Cl.[4] ..... G21C 3/16; G21C 3/32

[52] U.S. Cl. ..... 376/428; 376/435

*Primary Examiner*—Harvey E. Behrend

*Attorney, Agent, or Firm*—Volker R. Ulbrich

[57] ABSTRACT

The fuel pellets inside the fuel rods of a boiling water reactor are made with a lower enrichment concentration in the axial radial region and a higher concentration near the peripheral radial region to reduce thermal expansion effects upon sudden rises in temperature of the pellet when the reactor power is abruptly increased by a rapid step-wise withdrawal of a control rod. At least rods immediately adjacent the control rods contain pellets of this type, but additional rods may also be of this construction.

1 Claim, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 2

| | | | | | | | | |
|---|---|---|---|---|---|---|---|---|
| LL | L | ML | M | H | H | M | ML | L |
| L | ML* | M | ML* | H | H | ML* | H | ML |
| L | M | M | H | H | H | H | ML* | M |
| ML | ML* | H | H | H | W | H | H | H |
| ML | M | H | H | W | H | H | H | H |
| L | M | M | H | H | H | H | ML* | M |
| L | ML | ML* | M | H | H | M | M | ML |
| LL | L | ML | M | M | ML* | M | ML* | L |
| LL | LL | L | L | ML | ML | L | L | LL |

RODS WITH TWO ENRICHMENT PELLETS

LL RODS ( 5) --- 1.50 W/O U235
L RODS (12) --- 2.20 W/O U235
ML RODS (10) --- 2.84 W/O U235
M RODS (16) --- 3.72 W/O U235
H RODS (27) --- 4.34 W/O U235
ML* RODS ( 9) --- 2.84 W/O U235 + 4.00 W/O GD203
W RODS ( 2) --- INERT WATER ROD

3/6
FIG. 3
DUAL ENRICHMENT PELLET DESIGN
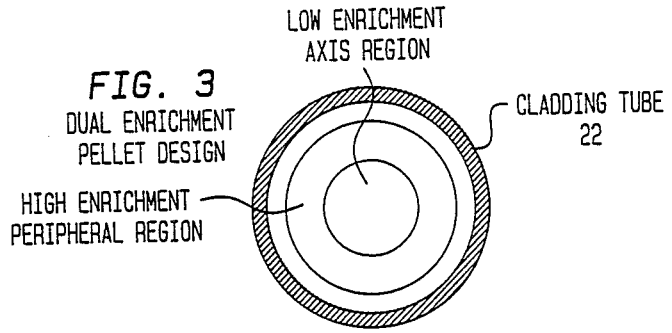
FIG. 4
TABLE 1 PELLET ENRICHMENT
| | W/O URANIUM-235 | | |
|---|---|---|---|
| | SINGLE ENRICHMENT DESIGN | TWO ENRICHMENT DESIGN | |
| FUEL ROD TYPE* | | CENTER REGION | PERIPHERAL REGION |
| LL | 1.50 | 0.71 | 1.76 |
| L | 2.20 | 0.71 | 2.70 |
| ML | 2.84 | 0.71 | 3.55 |
| M | 3.72 | 0.71 | 4.72 |
FIG.5
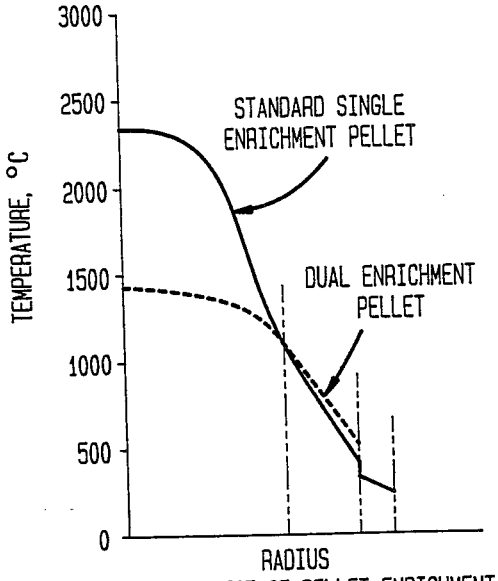
TYPICAL EFFECT OF PELLET ENRICHMENT ON FUEL TEMPERATURE DISTRIBUTION

FIG. 6

| | | | | | | | | |
|---|---|---|---|---|---|---|---|---|
| LL<br>0.91 | L<br>0.92 | ML<br>0.95 | M<br>1.01 | H<br>1.06 | H<br>1.05 | M<br>0.99 | ML<br>0.91 | L<br>0.87 |
| L<br>0.98 | ML*<br>0.97 | M<br>1.02 | ML*<br>0.86 | H<br>1.01 | H<br>1.00 | ML*<br>0.85 | H<br>1.05 | ML<br>0.91 |
| L<br>1.00 | M<br>1.07 | M<br>0.98 | H<br>1.00 | H<br>0.98 | H<br>0.98 | H<br>1.00 | ML*<br>0.85 | M<br>0.99 |
| ML<br>1.08 | ML*<br>0.95 | H<br>1.04 | H<br>0.99 | H<br>0.99 | W<br>0.00 | H<br>0.98 | H<br>1.00 | H<br>1.05 |
| ML<br>1.09 | M<br>1.07 | H<br>1.04 | H<br>1.00 | W<br>0.00 | H<br>0.99 | H<br>0.98 | H<br>1.01 | H<br>1.06 |
| L<br>1.03 | M<br>1.09 | M<br>1.00 | H<br>1.02 | H<br>1.00 | H<br>0.99 | H<br>1.00 | ML*<br>0.86 | M<br>1.01 |
| L<br>1.06 | ML<br>1.02 | ML*<br>0.94 | M<br>1.00 | H<br>1.04 | H<br>1.04 | M<br>0.98 | M<br>1.02 | ML<br>0.95 |
| LL<br>1.04 | L<br>1.01 | ML<br>1.02 | M<br>1.09 | M<br>1.07 | ML*<br>0.95 | M<br>1.07 | ML*<br>0.97 | L<br>0.92 |
| LL<br>1.14 | LL<br>1.04 | L<br>1.06 | L<br>1.03 | ML<br>1.09 | ML<br>1.08 | L<br>1.00 | L<br>0.98 | LL<br>0.91 |

RODS WITH TWO ENRICHMENT PELLETS

UNCONTROLLED LOCAL PEAKING DISTRIBUTION
WITH CONTROL BLADE HISTORY $\Delta E$ CONTROLLED = 5000 MWD/MTU
FUEL TYPE: 9x9 3.35 W/O U-235
VOID FRACTION: 0.40 EXPOSURE: 25000.00 MWD/MTU
MAX. LOCAL POWER (INTERIOR): 1.09
MAX. LOCAL POWER (PERIPHERAL): 1.14

FIG. 7

| | | | | | | | | |
|---|---|---|---|---|---|---|---|---|
| LL<br>0.93 | L<br>1.00 | ML<br>1.10 | M<br>1.25 | H<br>1.38 | H<br>1.42 | M<br>1.37 | ML<br>1.28 | L<br>1.23 |
| L<br>0.87 | ML*<br>0.98 | M<br>1.14 | ML*<br>1.04 | H<br>1.29 | H<br>1.34 | ML*<br>1.16 | H<br>1.46 | ML<br>1.28 |
| L<br>0.74 | M<br>0.98 | M<br>1.04 | H<br>1.17 | H<br>1.23 | H<br>1.29 | H<br>1.34 | ML*<br>1.16 | M<br>1.37 |
| ML<br>0.70 | ML*<br>0.79 | H<br>1.04 | H<br>1.11 | H<br>1.20 | W<br>0.00 | H<br>1.29 | H<br>1.34 | H<br>1.42 |
| ML<br>0.64 | M<br>0.82 | H<br>0.97 | H<br>1.06 | W<br>0.00 | H<br>1.20 | H<br>1.23 | H<br>1.29 | H<br>1.38 |
| L<br>0.55 | M<br>0.76 | M<br>0.85 | H<br>0.98 | H<br>1.06 | H<br>1.11 | H<br>1.17 | ML*<br>1.04 | M<br>1.25 |
| L<br>0.52 | ML<br>0.64 | ML*<br>0.70 | M<br>0.85 | H<br>0.97 | H<br>1.04 | M<br>1.04 | M<br>1.14 | ML<br>1.10 |
| LL<br>0.46 | L<br>0.55 | ML<br>0.64 | M<br>0.76 | M<br>0.82 | ML*<br>0.79 | M<br>0.98 | ML*<br>0.98 | L<br>1.00 |
| LL<br>0.44 | LL<br>0.46 | L<br>0.52 | L<br>0.55 | ML<br>0.64 | ML<br>0.70 | L<br>0.74 | L<br>0.87 | LL<br>0.93 |

RODS WITH TWO ENRICHMENT PELLETS

CONTROLLED LOCAL PEAKING DISTRIBUTION
WITH CONTROL BLADE HISTORY $\Delta E$ CONTROLLED = 5000 MWD/MTU
FUEL TYPE: 9x9 3.35 W/O U-235
VOID FRACTION: 0.40 EXPOSURE: 25000.00 MWD/MTU
MAX. LOCAL POWER (INTERIOR): 1.46
MAX. LOCAL POWER (PERIPHERAL): 1.42

FIG. 8

| | | | | | | | | |
|---|---|---|---|---|---|---|---|---|
| LL<br>0.98 | L<br>0.90 | ML<br>0.86 | M<br>0.81 | H<br>0.77 | H<br>0.74 | M<br>0.72 | ML<br>0.71 | L<br>0.71 |
| L<br>1.13 | ML*<br>0.99 | M<br>0.89 | ML*<br>0.83 | H<br>0.78 | H<br>0.75 | ML*<br>0.73 | H<br>0.72 | ML<br>0.71 |
| L<br>1.35 | M<br>1.09 | M<br>0.94 | H<br>0.85 | H<br>0.80 | H<br>0.76 | H<br>0.75 | ML*<br>0.73 | M<br>0.72 |
| ML<br>1.54 | ML*<br>1.20 | H<br>1.00 | H<br>0.89 | H<br>0.83 | W<br>0.00 | H<br>0.76 | H<br>0.75 | H<br>0.74 |
| ML<br>1.70 | M<br>1.30 | H<br>1.07 | H<br>0.94 | W<br>0.00 | H<br>0.83 | H<br>0.80 | H<br>0.78 | H<br>0.77 |
| L<br>1.87 | M<br>1.43 | M<br>1.18 | H<br>1.04 | H<br>0.94 | H<br>0.89 | H<br>0.85 | ML*<br>0.83 | M<br>0.81 |
| L<br>2.04 | ML<br>1.59 | ML*<br>1.34 | M<br>1.18 | H<br>1.07 | H<br>1.00 | M<br>0.94 | M<br>0.89 | ML<br>0.86 |
| LL<br>2.26 | L<br>1.84 | ML<br>1.59 | M<br>1.43 | M<br>1.30 | ML*<br>1.20 | M<br>1.09 | ML*<br>0.99 | L<br>0.92 |
| LL<br>2.59 | LL<br>2.26 | L<br>2.04 | L<br>1.87 | ML<br>1.70 | ML<br>1.54 | L<br>1.35 | L<br>1.13 | LL<br>0.98 |

RODS WITH TWO ENRICHMENT PELLETS

UNCONTROLLED/CONTROLLED LOCAL PEAKING DISTRIBUTION
WITH CONTROL BLADE HISTORY ΔE CONTROLLED = 5000 MWD/MTU
FUEL TYPE: 9x9 3.35 W/O U-235
VOID FRACTION: 0.40 EXPOSURE: 25000.00 MWD/MTU

NUCLEAR REACTOR FUEL WITH RADIALLY VARYING ENRICHMENT

FIELD OF THE INVENTION

The invention relates to nuclear fission reactors for turbine steam generation, particularly those of the boiling water reactor (BWR) type.

BACKGROUND OF THE INVENTION

In a BWR, a core is immersed in water inside a reactor vessel to heat the water for generating steam. The core is made up of a plurality of fuel assemblies, each of which is a bundle of parallel, regularly-spaced metal cladding fuel tubes filled with fuel pellets of enriched fissionable material. The water being heated acts as moderator to generate thermal neutrons for the fission reaction. Control of the reaction is afforded by means of neutron-absorbing control rods extending into the core within control rod channels formed by relatively wide gaps between the fuel assemblies and inserted or withdrawn longitudinally to determine the desired total neutron flux. Typically, the control rods have a cruciform crossection, with four arms extending within the gaps between four adjacent assemblies, which are arranged in a square cross section.

One problem with BWR's is that when a control rod is abruptly moved even a short distance in the withdrawal direction to increase the power output, such as occurs when control movement is made in steps, the water which moves into the space previously occupied by the control rod provides greatly increased neutron flux for the fuel rods at the outside of the fuel assemblies which border the control rod channel. This leads to a rapid temperature rise in the interior bulk of their fuel pellets, with attendant possible damage to their cladding by fission gas release which can cause cladding embrittlement and by known radial thermal expansion fuel-cladding interaction phenomena. This effect can be countered by reducing the flow of water through the reactor to lower the neutron flux of the entire reactor prior to withdrawing the control rod. However, such measures result in a significant power production loss.

SUMMARY OF THE INVENTION

In accordance with the present invention, the fuel rods located at the outside of the fuel assemblies and bordering the water in the control rod channel contain a novel type of "dual enrichment" fuel pellet which has a lower concentration of uranium enrichment in its inner radial region near its longitudinal axis than in its outer radial region remote from the axis. With this dual enrichment fuel pellet content, the fuel tubes maintain a more uniform and reduced temperature internally and therefore exhibit less radial thermal expansion when the control rod is withdrawn. This means that the power need not be reduced prior to control rod withdrawal, resulting in significant avoidance of power production losses.

BRIEF DESCRIPTION OF THE DRAWINGS

FIG. 2 is a schematic representation of a fuel assembly cross-section showing specific fuel rod locations.

FIG. 3 is a schematic cross-sectional view of a fuel pellet with dual enrichment in accordance with the invention.

FIG. 4 is a table showing fuel enrichment combinations for the pellet of FIG. 3.

FIG. 5 is a graphical representation of the temperature distribution in the dual enrichment pellet as compared to a single enrichment pellet.

FIG. 6–8 are local power distribution charts for fuel rods of an assembly comprising fuel rods with dual enrichment in accordance with one embodiment of the present invention.

DETAILED DESCRIPTION

Figure 1:
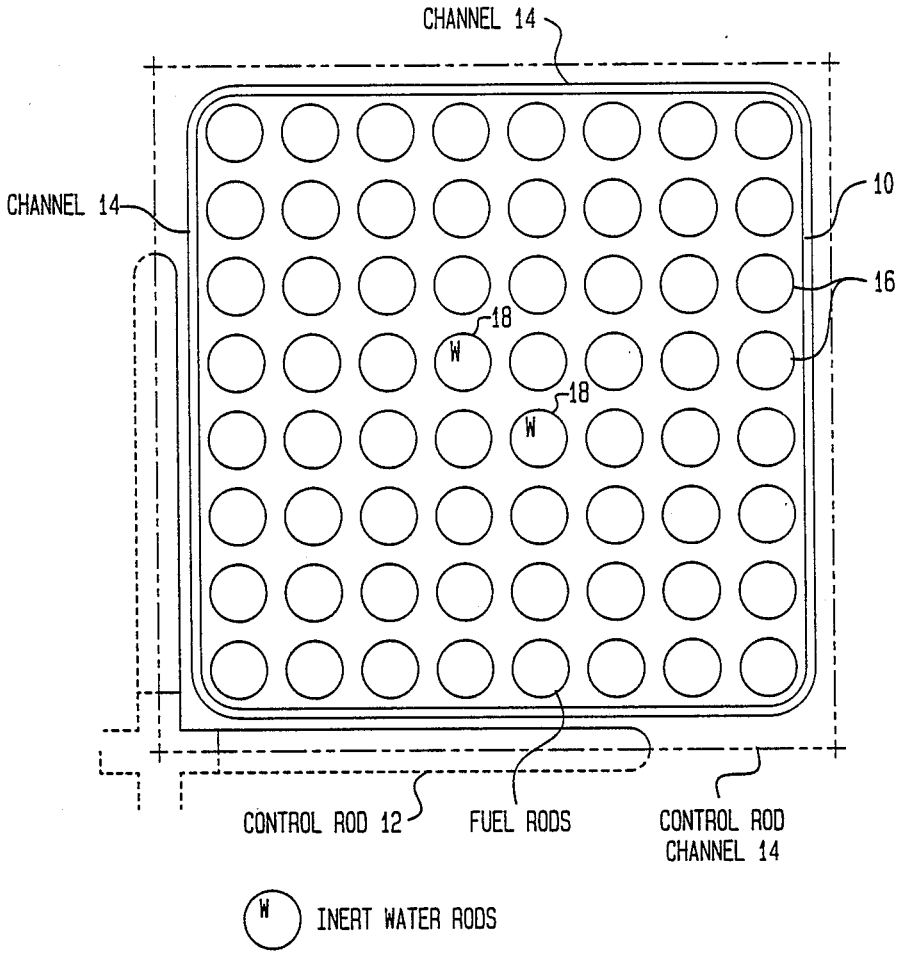
FIG. 1 is a cross-sectional view of a single fuel assembly and a portion of an adjacent control rod.

A typical BWR fuel assembly consists of a cross-sectionally square array of fuel rods held by spacers and surrounded by a control rod channel. The control rods used in a BWR are cruciform in shape and are located in a control rod channel between fuel assemblies. An outline drawing of the cross-section of a single fuel assembly 10 and a control rod 12 in a channel 14 is shown in FIG. 1. When the reactor is operating, some of the control rods 12 are inserted, some are partially inserted, and the remainder are withdrawn from the reactor core. The space 14 between control rod channels becomes filled with unvoided water when the control rod 12 is withdrawn. The unvoided water supplies a high flux of thermal neutrons to the fuel rods 18 bordering the channel 14.

To produce an acceptable power distribution across the fuel assembly, several different Uranium-235 enrichments are normally used in a BWR fuel design. Also, there may be one or more water-filled rods 18 for adjustment of cross-sectional moderator distribution. The enrichments of the fuel rods 16 bordering the channel 14 are typically lower than the average in order to compensate for the higher thermal neutron flux. An example of a BWR Uranium-235 enrichment design is shown schematically in FIG. 2. In the FIG. 2, the square boxes in the array represent fuel rod locations. Those boxes outlined in solid lines indicate locations leaving fuel rods most susceptible to damage resulting from step-wise control rod movement.

The control rods in most boiling water reactors (BWR) are designed to move step-wise in increments of six inches. Reactor operating experience with $8\times8$ fuel assemblies has shown that if the control rods are moved step-wise at full power, there is a significant probability of fuel failure in the higher exposure fuel rods, which are operating at higher temperatures and are located adjacent the control channel.

When the reactor is operating with a control rod 12 inserted, the fuel rods 16 located next to the control rod 12 accumulate less neutron exposure than the assembly average exposure, which is attributable to a control blade history effect. When the control rod 12 is withdrawn, the power is therefore higher in the lower exposure fuel rods.

The present invention provides a reduction in the temperature in a fuel pellet by the provision of dual concentrations of Uranium-235 enrichment in the radial direction across the fuel pellet. A cross-section of such a pellet 20 is shown in FIG. 3. By lowering the Uranium-235 enrichment in axial region 22 of the pellet and increasing the enrichment of the fuel in the peripheral region 24 located next to the cladding tube 26 clad, the maximum fuel temperature is reduced without changing the relative power generation in the fuel rod 16. Typical Pellet Uranium-235 enrichments for the dual enrichment pellet 20 are compared to single enrichments in the Table 1 of FIG. 4. The numbers represent percentage of Uranium-235 in the pellet material. A plot of fuel temperature as a function of pellet radius for both a single enrichment and a dual enrichment pellet design is shown in FIG. 5.

In accordance with this invention, fuel rods containing dual enrichment fuel pellets are used in place of ones containing single enrichment pellets in any fuel rods which are susceptible to pellet-cladding interaction failure. Since the fuel temperature is lower in the dual enrichment pellet design, the control rods can be then moved step-wise at a higher reactor power, resulting in minimal or no loss of reactor power production. Typical fuel assembly locations for the fuel rods containing dual enrichment pellets are indicated by solid line boxes in FIGS. 6 through 7, which show local power distribution maps, including control blade history effects for an uncontrolled and a controlled fuel assembly. The fuel rod type designations of FIG. 4 are used. The ratio of the uncontrolled power distribution to the controlled power distribution is shown in FIG. 8. Again, the numerical figures represent present concentration of U-235.

In fuel rods operating at lower relative powers or not located close to the control rods, the standard single enrichment pellet approach is retained, in order to minimize the fuel costs. The maximum Uranium-235 enrichment is higher for the dual enrichment design. By using the single enrichment design in the high enrichment fuel rods, the required Uranium-235 enrichments can be kept within the fuel manufacturing criticality safety limits, which are usually set at around 5%.

While thus far the invention has been presented in terms of fuel pellets with two different concentrations of enrichment, it is contemplated that similar advantages would be obtained with a graded concentration which decreases as the central axis of the pellet is approached. However, such a pellet design would be difficult to manufacture. Alternatively, the pellet could have more than two different concentric radial regions of different concentrations. The concentrations and their distribution would be designed to minimize peak and average cross-sectional temperature in the pellet, thereby minimizing radial thermal expansion with temperature change of the pellet as a whole and reducing the release of fission products such as cesium and iodine which have an embrittling effect on the cladding and contribute to failure by stress corrosion cracking as stresses are applied to the cladding during pellet thermal expansion.

It should also be evident that varying enrichment concentration fuel rods would be likely to be well suited for other fuel rod locations in a reactor, except for their relatively high cost of manufacture.

We claim:

1. A nuclear reactor fuel assembly, comprising:

a cylindrical fuel cladding tube having a longitudinal axis, and fissionable nuclear fuel inside said tube, said fuel comprising an enriched material, the concentration of the enriched material being less in the radial region of the longitudinal axis than in the radial region remote from the longitudinal axis.

* * * * *